United States Patent
Skelly

(10) Patent No.: US 7,219,143 B1
(45) Date of Patent: *May 15, 2007

(54) AUTOMATIC NOTIFICATION USING SPECIFIC LOG FILE FOR ENVIRONMENTAL CONDITION VIA FTP SERVER

(75) Inventor: Matthew Sean Skelly, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 885 days.

This patent is subject to a terminal disclaimer.

(21) Appl. No.: 10/309,624

(22) Filed: Dec. 4, 2002

(51) Int. Cl.
*G06F 15/173* (2006.01)
(52) U.S. Cl. ............. 709/223; 709/217; 709/230; 719/318; 719/319
(58) Field of Classification Search ........ 709/217, 709/206, 223, 224, 229, 230; 707/1, 10; 719/318, 319; 379/88.12, 252; 455/412.2
See application file for complete search history.

(56) References Cited

U.S. PATENT DOCUMENTS

| | | | |
|---|---|---|---|
| 5,933,604 A * | 8/1999 | Inakoshi | 709/226 |
| 6,601,066 B1 * | 7/2003 | Davis-Hall | 707/5 |
| 6,999,992 B1 * | 2/2006 | Deen et al. | 709/206 |
| 2002/0046299 A1 * | 4/2002 | Lefeber et al. | 709/318 |
| 2002/0107927 A1 * | 8/2002 | Gallant | 709/206 |
| 2003/0135566 A1 * | 7/2003 | Nishiguchi et al. | 709/206 |
| 2005/0130631 A1 * | 6/2005 | Maguire et al. | 455/414.1 |

* cited by examiner

*Primary Examiner*—Frantz B. Jean
(74) *Attorney, Agent, or Firm*—Phuong-Quan Hoang; Charles A. Johnson; Beth L. McMahon

(57) ABSTRACT

An embodiment of the invention is a technique to automatically notify a recipient upon occurrence of an event. A connection is made to a file transfer protocol (FTP) site provided by a user. A user name and a password are sent to the FTP site. A file name in a directory at the FTP site is retrieved. The directory is provided by the user. The file name is compared with a string supplied by the user. The string corresponds to a monitor event. A recipient is notified of the monitor event if the file name matches the string according to notification information.

30 Claims, 10 Drawing Sheets

AUTOMATIC NOTIFICATION USING SPECIFIC LOG FILE FOR ENVIRONMENTAL CONDITION VIA FTP SERVER

CROSS REFERENCE TO RELATED APPLICATIONS

This application is related to the following applications: Ser. No. 10/309,621 entitled "Automatic Notification Upon Failure Of Hardware Compatibility Test"; Ser. No. 10/309,623 entitled "Automatic Notification Upon Test Completion With Specific Log File"; Ser. No. 10/309,609 untitled "Automatic Notification Upon Test Completion With Any Log File"; Ser. No. 10/309,622 entitled "Automatic Notification Using Any Log File For Environmental Condition Via FTP Server", filed on the same date as the present application and assigned to the same assignee, the contents of each of which are herein incorporated by reference.

BACKGROUND OF THE INVENTION

1. Field of the Invention

Embodiments of the invention relates generally to the field of test monitoring, and more specifically, to automatic notification of monitor event.

2. Description of Related Art

In a typical test scenario, a system or a device under test is subject to a test or a series of test programs designed to test for specific requirements such as performance or compatibility. There are several test or monitor events that are of interest to test personnel. Examples of these events include a test failure, a test completion, and an occurrence of an environmental condition (e.g., a temperature threshold is exceeded).

The length of a test or monitoring task may vary depending on the test parameters and system or device configurations. There are tests that may take several hours or even several days to complete. These tests are run continuously over an extended period including off-hours. During these hours, test personnel are typically not located in the vicinity of the system or the device under test to check the test status or to continue the testing when it is interrupted by an error event. Currently, known techniques for testing and/or monitoring a device or system have no capability to inform or notify in real time remote users of a test event and/or a monitor event.

BRIEF DESCRIPTION OF THE DRAWINGS

The invention may best be understood by referring to the following description and accompanying drawings that are used to illustrate embodiments of the invention. In the drawings.

SUMMARY OF THE INVENTION

An embodiment of the invention is a technique for automatically notifying a recipient upon occurrence of an event. A connection is made to a file transfer protocol (FTP) site provided by a user. A user name and a password are sent to the FTP site. A file name in a directory at the FTP site is retrieved. The directory is provided by the user. The file name is compared with a string supplied by the user. The string corresponds to a monitor event. A recipient is notified of the monitor event if the file name matches the string according to notification information.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
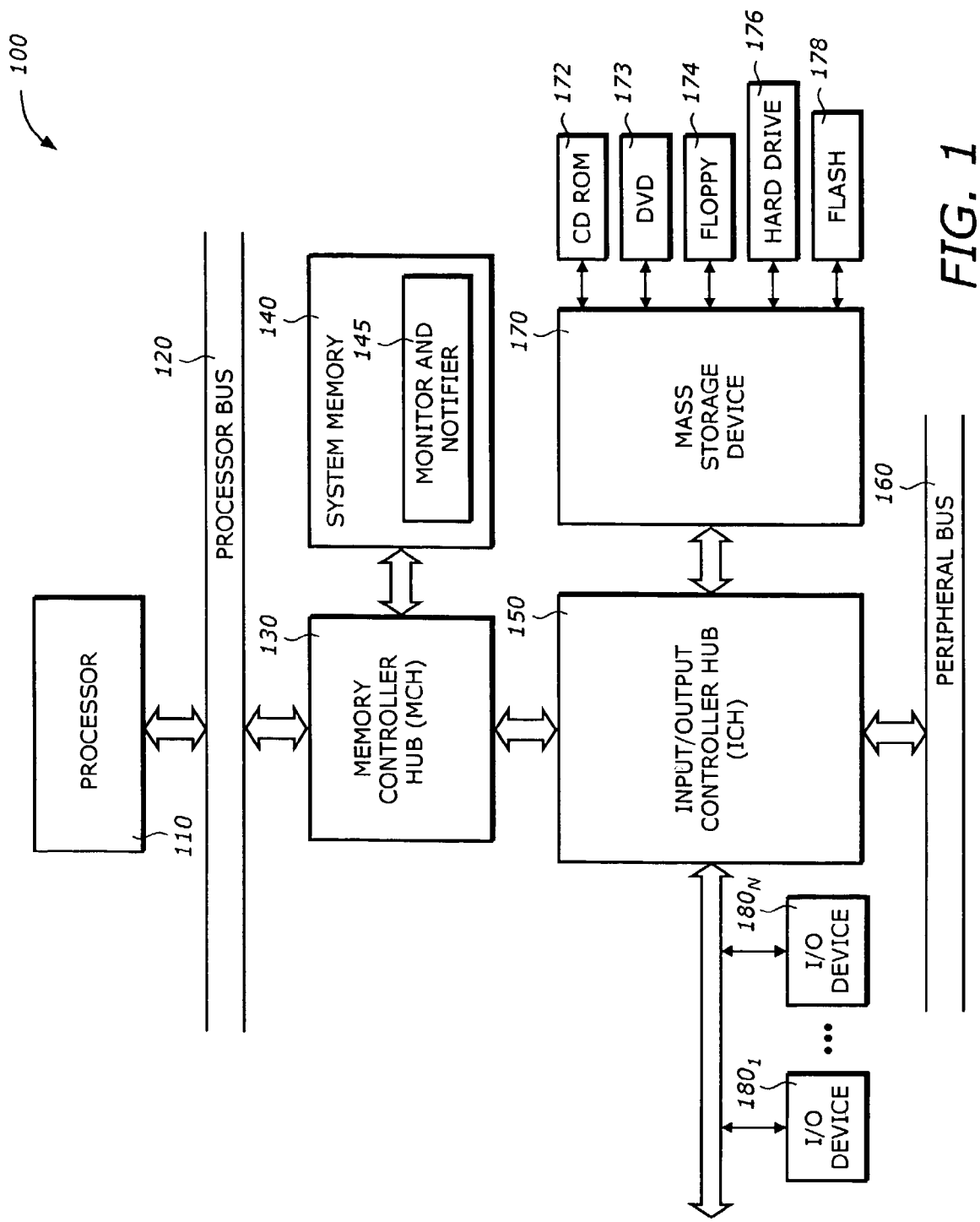
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a memory control hub (MCH) 130, a system memory 140, an input/output control hub (ICH) 150, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces with the peripheral bus 160. For clarity, not all the peripheral buses are shown. It is contemplated that the system may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a monitor and notifier 145. Any one of the elements of the monitor and notifier 145 may be implemented by hardware, software, firmware, microcode, or any combination thereof. The system memory 140 may also include other programs or data which are not shown, such as an operating system. The monitor and notifier 145 contains program code that, when executed by the processor 110, causes the processor 110 to perform operations as described below.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface with the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The system 100 may interface to a number of other systems or devices including system or device under test, an e-mail server, a file transfer protocol (FTP) server. The monitor and notifier 145 may interface to other programs located in the system 100 or in any other systems or servers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
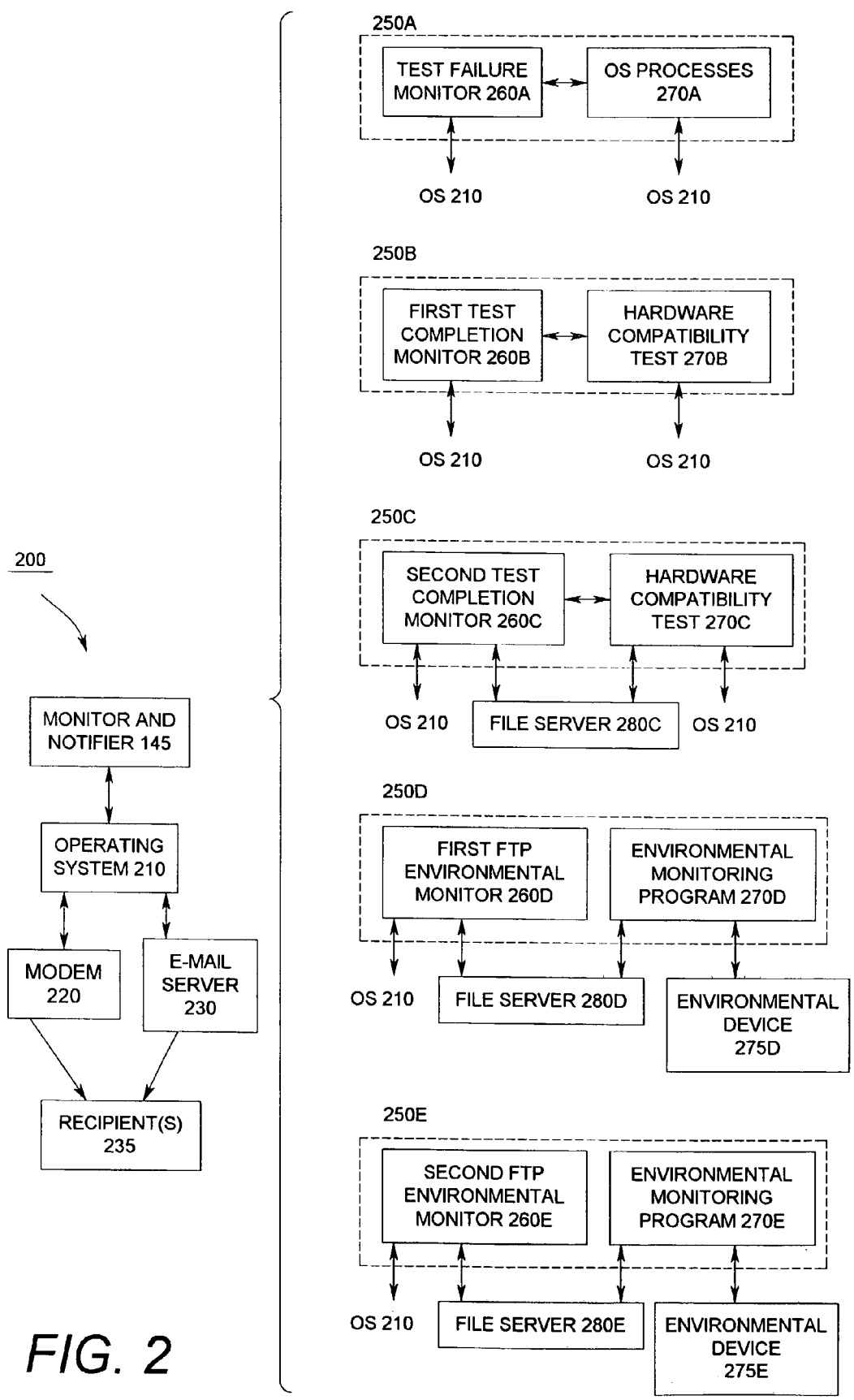
FIG. 2 is a diagram illustrating a software architecture according to one embodiment of the invention.

FIG. 2 is a diagram illustrating a software architecture 200 according to one embodiment of the invention. The software architecture 200 includes the monitor and notifier 145, the operating system (OS) 210, a modem 220, an electronic mail (e-mail) server 230 and a recipient or recipients 235.

The monitor and notifier 145 monitors a system condition in real time and notifies the recipient 235 upon occurrence of a monitor event. This monitor event is typically generated by a separate and independent process. Examples of this process include a test failure, a test completion, and an environmental event. In one embodiment, the monitor and notifier 145 monitors progress of a test program and notifies a recipient or recipients of the monitor event.

The operating system 210 provides the basic operating systems functions and additional monitoring and multiprocessor support capabilities. The OS 210 has drivers to interface with and control the modem 220 and the e-mail server 230. The OS 210 also has a qualification process to test and qualify hardware devices for compatibility. In one embodiment, the OS 210 is the Windows 2000™ from Microsoft having a Datacenter program. The Windows Datacenter program has a series of Hardware Compatibility Tests (HCTs) to ensure that a hardware device or system is compatible with the Windows OS. Examples of HCTs include stress tests which require a system or device under test to run a series of test programs over an extended period of time (e.g., 7 days, 14 days). When such a stress test is performed, the system or device under test typically runs the test program or programs continuously, twenty four hours a day, seven days a week. While the test program is run, it is desirable to know the test result when it is completed. When test personnel are not available due to off-hours, it is desirable to inform or notify the test personnel as soon as possible so that subsequent actions can be immediately taken to accelerate the testing process, reducing idle time.

The modem 220 is a communication interfacing device to connect to a dial-up equipment such as a telephone. The modem 220 provides a means for the monitor and notifier 145 to notify a recipient (e.g., test personnel) of the monitor event as soon as the monitor event occurs. The notification may be transmitted to a cell phone or a pager accessible to the recipient at a remote site. The e-mail server 230 provides a means to send a notification by e-mail to the recipient. The notification information may include at least one of the following: a page code, a retry number, a monitor interval, a recipient electronic mail (e-mail) address, a pager number, a cell phone number, a sender e-mail address, an e-mail server, an outside code, and a communication port identifier. The recipient or recipients 235 receives or receive the notification sent from the modem 220 or the e-mail server 230. The recipient 235 may have a pager or a cell phone to receive the notification message text sent by the modem 220. The recipient or recipients 235 may also have access to an e-mail facility to receive e-mail notification message sent by the e-mail server 230. The recipient or recipients 235 are usually test personnel who are interested to know if a monitor event has occurred so that subsequent actions can be taken as soon as possible. In a typical scenario, the recipient or recipients 235 are located remotely to the system or device under test, such as during off hours.

The monitor and notifier 145 may be configured to accommodate various monitoring tasks. The monitor and notifier 145 may be located in configurations 250A, 250B, 250C, 250D, and 250E as monitor programs, namely, test failure monitor 260A, first test completion monitor 260B, second test completion monitor 260C, first FTP environmental monitor 260D, and second FTP environmental monitor 260E, respectively.

In the configuration 250A, the monitor and notifier 145 becomes a test failure monitor 260A interacting with OS processes 270A. The test failure monitor 260A monitors a test application running on a client master system. The client master system controls the tests running on other systems which stress a system under test. In one embodiment, the system under test runs the Windows 2000 Datacenter OS. When the test fails, an application is launched on the client master monitored by the test failure monitor 260A. The OS processes 270A include a number of processes that run as part of the test programs. In particular, when a test program indicates a failure, one failure application is launched or generated. In one embodiment, this failure application is named "going.exe" under the Windows 2000™ Datacenter OS. When this failure application is generated, the test failure monitor 260A starts the notification process to notify the recipient according to the notification information.

In the configuration 250B, the monitor and notifier 145 becomes a first test completion monitor 260B interacting with a hardware compatibility test (HCT) 270B. The first test completion monitor 260B monitors a test program to determine if a test has been completed. The HCT 270B is a test program that creates a log file when the test has completed. The test may take several minutes to several hours. The test completion time is not known in advance. The first test completion monitor 260B periodically checks to determine if the log file has been created. If so, it starts the notification process to notify the recipient according to the notification information.

In the configuration 250C, the monitor and notifier 145 becomes a second test completion monitor 260C interacting with a HCT 270C. The second test completion monitor 260C interfaces with a file server 280C and monitors several automated tests as part of the HCT 270C. The length of these tests varies and depends on the particular configuration of the system under test. The HCT 270C includes a number of test programs that create several log files that are copied to a directory of the file server 280C upon test completion. The second test completion monitor 260C periodically reads a list in a directory provided by a user and determines if the list contains at least a log file. If the list contains at least a log file, the second test completion monitor 260C notifies a recipient according to the notification information.

In the configuration 250D, the monitor and notifier 145 becomes a first file transfer protocol (FTP) environmental monitor 260D. The first FTP environmental monitor 260D monitors an environmental condition as provided by an environmental monitoring program 270D by interfacing with a FTP server 280D. The environmental monitoring program 270D controls an environmental device or sensor 275D (e.g., temperature sensor) and resides or interfaces to the FTP server 280D. When an environmental threshold is reached (e.g., a temperature threshold is exceeded), the environmental monitoring program 270D generates a file in the FTP server 280D. The first environmental monitor 260D retrieves files in a directory at the FTP site of the FTP server 280D and compares the file names with a string representing the file when the environmental threshold is reached. The directory is provided by the user. If a file name in the retrieved file names matches the string, the first environmental monitor 260D notifies the recipient according to the notification information.

In the configuration 250E, the monitor and notifier 145 becomes a second file transfer protocol (FTP) environmental monitor 260E. The second FTP environmental monitor 260E monitors an environmental condition as provided by an environmental monitoring program 270E by interfacing with a FTP server 280E. The environmental monitoring program 270E controls an environmental device or sensor 275E (e.g., temperature sensor) and resides in or interfaces with the FTP server 280E. The environmental monitoring program 270E generates a number of files in the FTP server 280E. These files may include image files provided by the environmental sensor 275E and status file. The second environmental monitor 260D reads a list in a directory at the FTP site of the server 280E. The directory is provided by the user. The second environmental monitor 260E determines if the list contains at least a file. If the list contains at least a file, the second environmental monitor 260E notifies the recipient according to the notification information.

Figure 3:
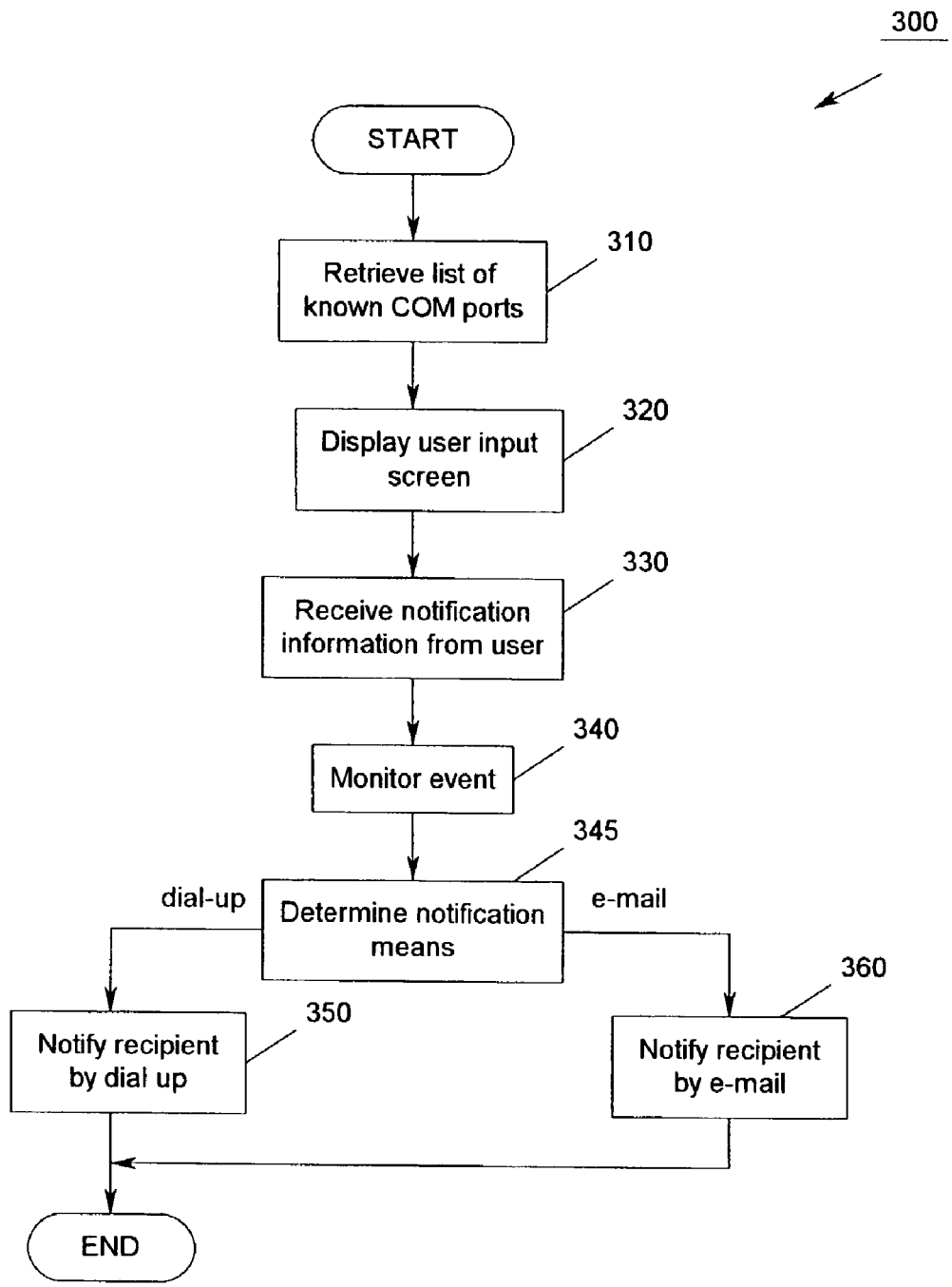
FIG. 3 is a flowchart illustrating a process to monitor and notify a recipient according to one embodiment of the invention.

FIG. 3 is a flowchart illustrating a process 300 to monitor and notify a recipient according to one embodiment of the invention.

Upon START, the process 300 retrieves a list of known communication ports (Block 310). These communications ports may be serial or parallel depending on the communication interface. Next, the process 300 displays the user-input screen (Block 320). The user-input screen may include a menu to allow the user to enter the notification information and the relevant monitoring parameters (e.g., string representing file name, directory path). Then, the process 300 receives the notification information from the user (Block 330). The notification information may include page code, a retry number, a monitor interval, a recipient electronic mail (e-mail) address, a pager number, a cell phone number, a sender e-mail address, an e-mail server, an outside code (e.g., 9), and a communication port identifier.

Next, the process 300 monitors the relevant test or condition (Block 340). The specific monitoring procedure depends on the type of monitoring task and will be explained in more details in FIGS. 4A through 4E. Then, the process 300 determines the desired notification means (Block 345). If the desired notification means is dial-up, the process 300 notifies the recipient by dial-up (Block 350) and is then terminated. If the desired notification means is e-mail, the process 300 notifies the recipient by e-mail (Block 360) and is then terminated. If the desired notification means is both dial-up and e-mail, the process 300 performs both Blocks 350 and 360 in any order.

Figure 4A:
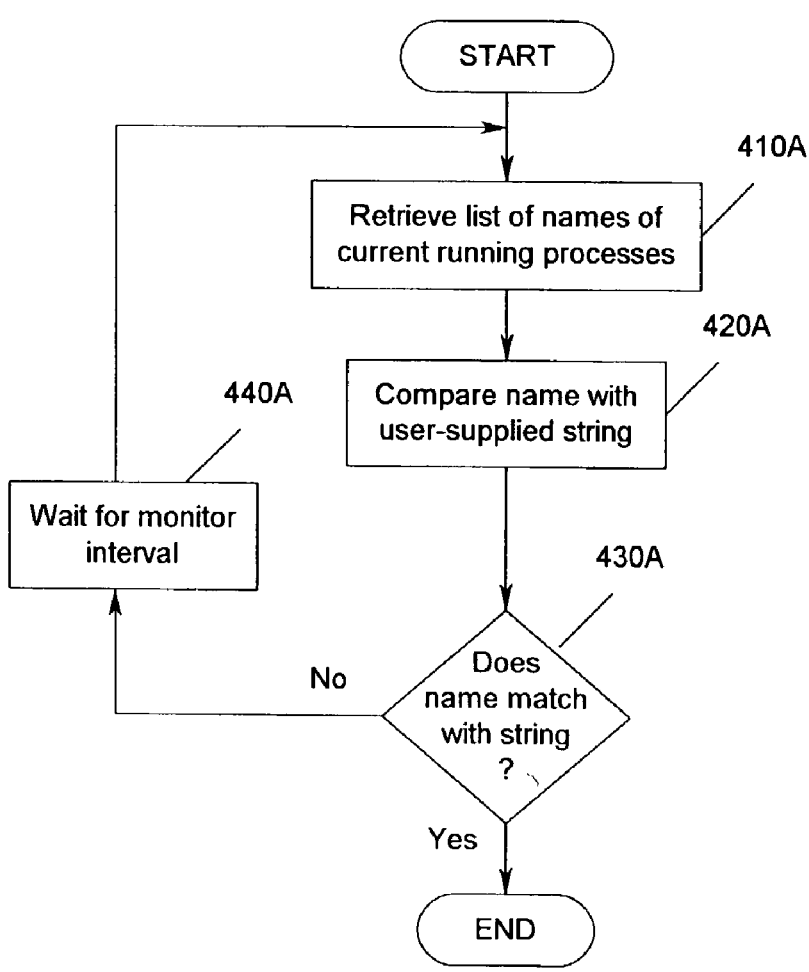
FIG. 4A is a flowchart illustrating a process to generate a monitor event based on a test failure according to a first embodiment of the invention.

FIG. 4A is a flowchart illustrating a process 340 to generate a monitor event based on a test failure according to one embodiment of the invention.

Upon START, the process 340 retrieves the list of names of the current running processes (Block 410A). Then, the process 340 compares each of the names with a string supplied by the user (Block 420A). The string corresponds to a monitor event such as a test failure. Next, the process 340 determines if the name matches the string (Block 430A). If not, the process 340 waits for a monitor interval as provided by the user (Block 440A) and then returns to Block 410A. Otherwise, the process 340 is terminated.

Figure 4B:
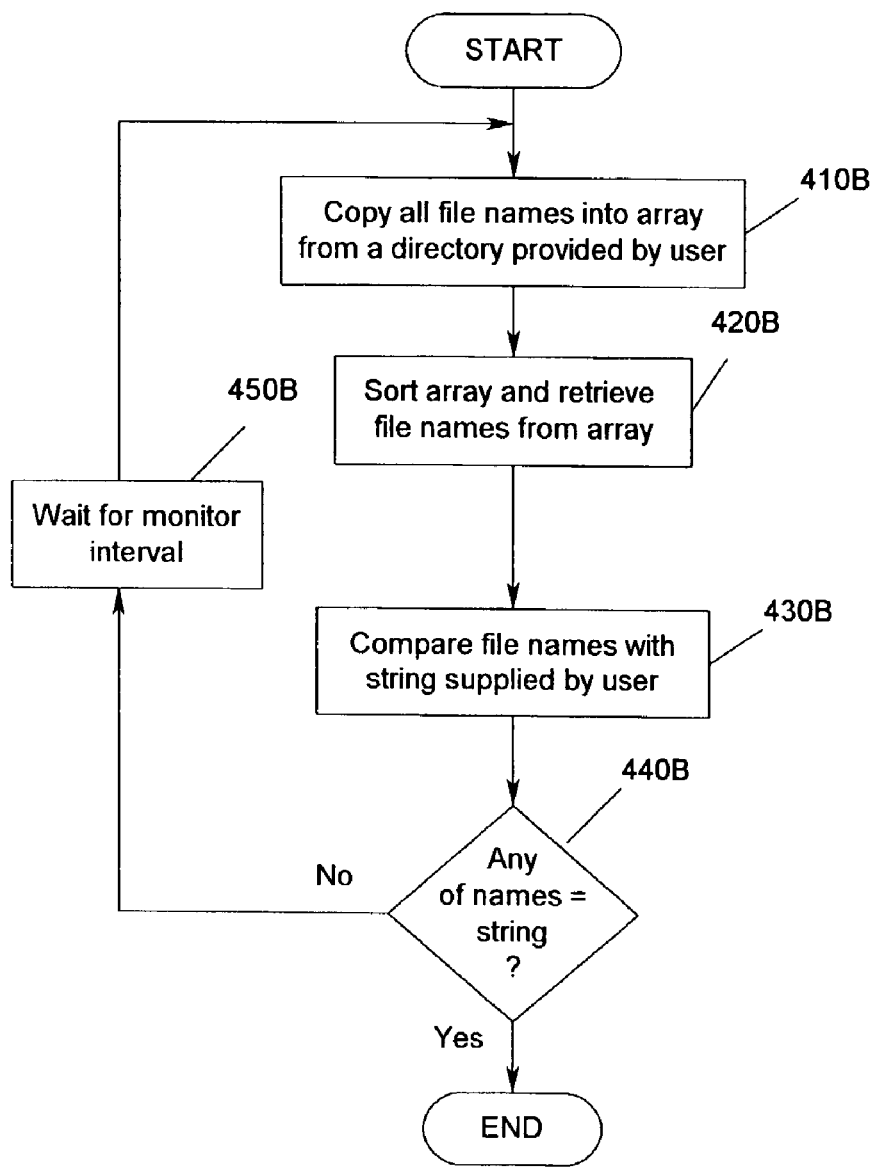
FIG. 4B is a flowchart illustrating a process to generate a monitor event based on a first test completion according to a second embodiment of the invention.

FIG. 4B is a flowchart illustrating a process 340 to generate a monitor event based on a first test completion according to one embodiment of the invention.

Upon START, the process 340 copies all the file names into an array from a directory provided by a user (Block 410B). Then, the process 340 sorts the array and retrieves the file names from the array (Block 420B). Next, the process 340 compares the file names with a string supplied by the user (Block 430B). The string corresponds to a monitor event, such as a test completion. Then, the process 340 determines if any of the file names match the string (Block 440B). If none of the file names matches the string, the process 340 waits for a monitor interval provided by the user (Block 450B) and then returns to Block 410B. Otherwise, the process 340 is terminated.

Figure 4C:
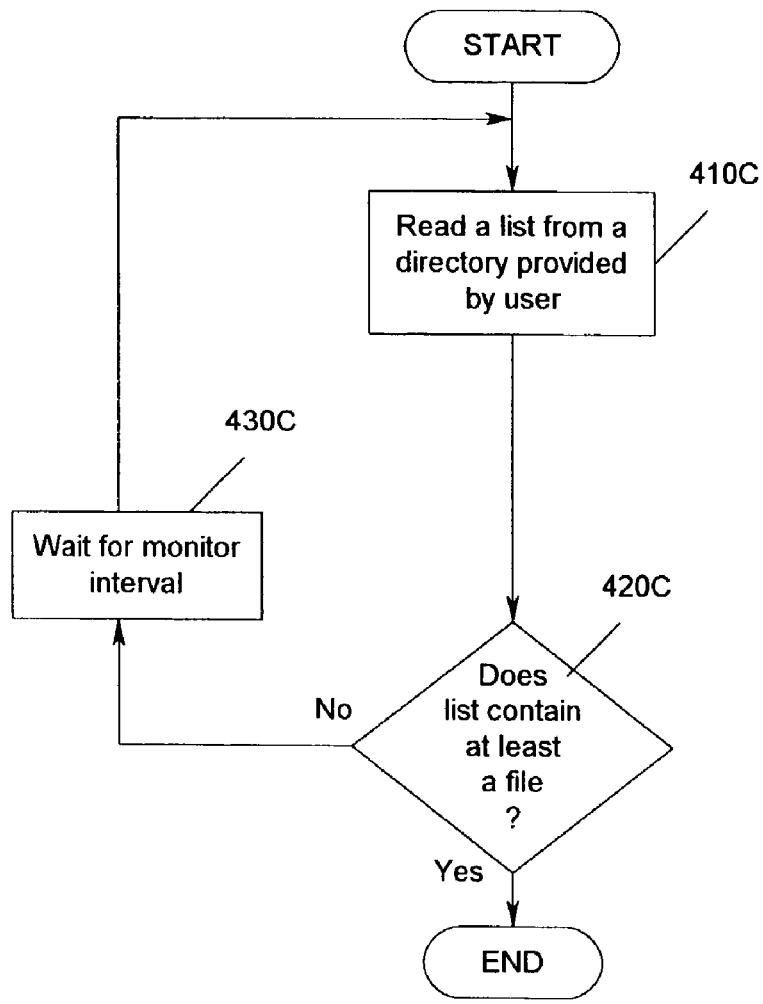
FIG. 4C is a flowchart illustrating a process to generate a monitor event based on a second test completion according to a third embodiment of the invention.

FIG. 4C is a flowchart illustrating a process 340 to generate a monitor event based on a second test completion according to one embodiment of the invention.

Upon START, the process 340 reads a list from a directory (Block 410C). The directory is provided by a user. Then, the process 340 determines if the list contains at least a file (Block 420C). The file is generated upon occurrence of a monitor event, such as a test completion. If the list does not contain at least a file, or is empty, the process 340 waits for a monitor interval as provided by the user (Block 430C) and returns to Block 410C. Otherwise, the process 340 is terminated.

Figure 4D:
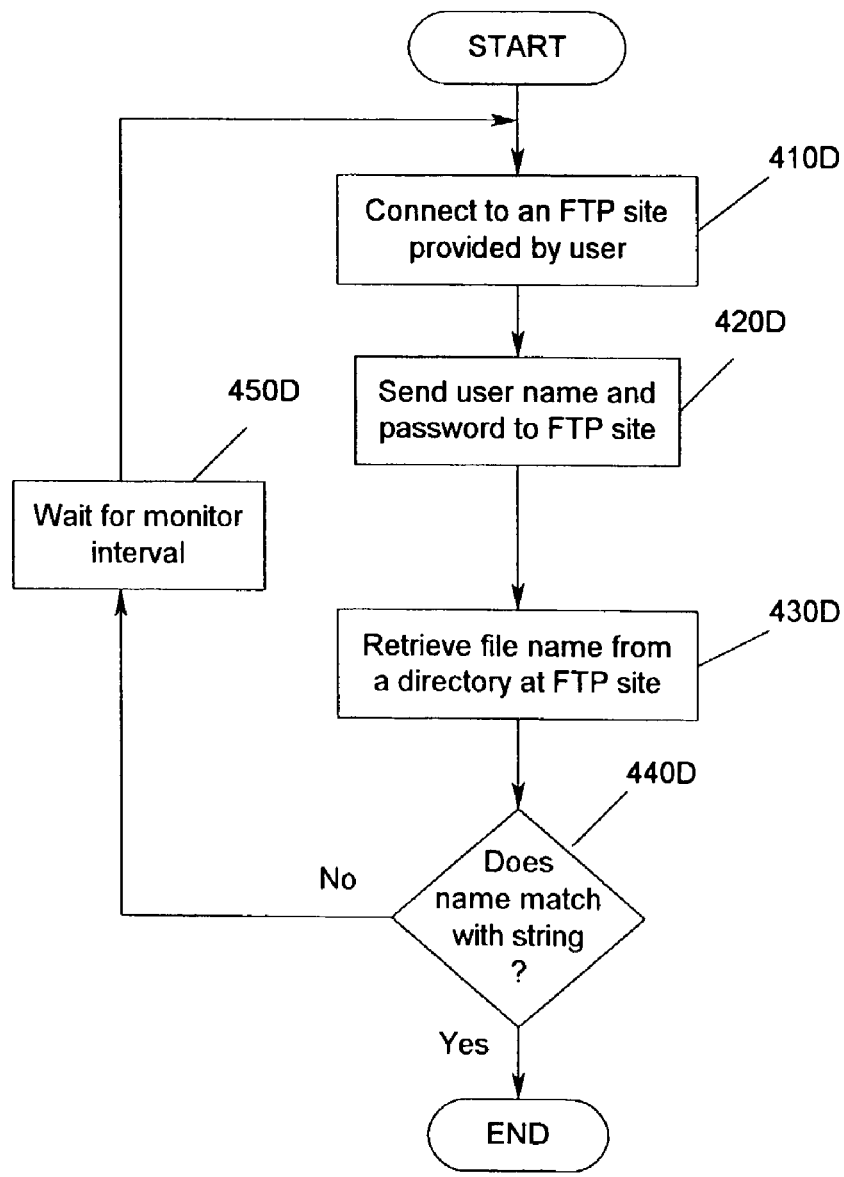
FIG. 4D is a flowchart illustrating a process to generate a monitor event based on a first environmental condition via FTP according to a fourth embodiment of the invention.

FIG. 4D is a flowchart illustrating a process 340 to generate a monitor event based on a first environmental condition via FTP according to one embodiment of the invention.

Upon START, the process 340 connects to a file transfer protocol (FTP) site provided by a user (Block 410D). Then, the process 340 sends a user name and a password the FTP site (Block 420D). Next, the process 340 retrieves a file name in a directory at the FTP site (Block 430D). The directory is provided by the user. The process 340 may change the path to the directory as appropriate. Then, the process 340 compares the file name with a string supplied by the user (Block 440D). The string corresponds to a monitor event, such as the event of an environmental (e.g., temperature) threshold being exceeded. If the file name does not match the string, the process 340 waits for a monitor interval (Block 450D) and then returns to Block 410D. Otherwise, the process 340 is terminated.

Figure 4E:
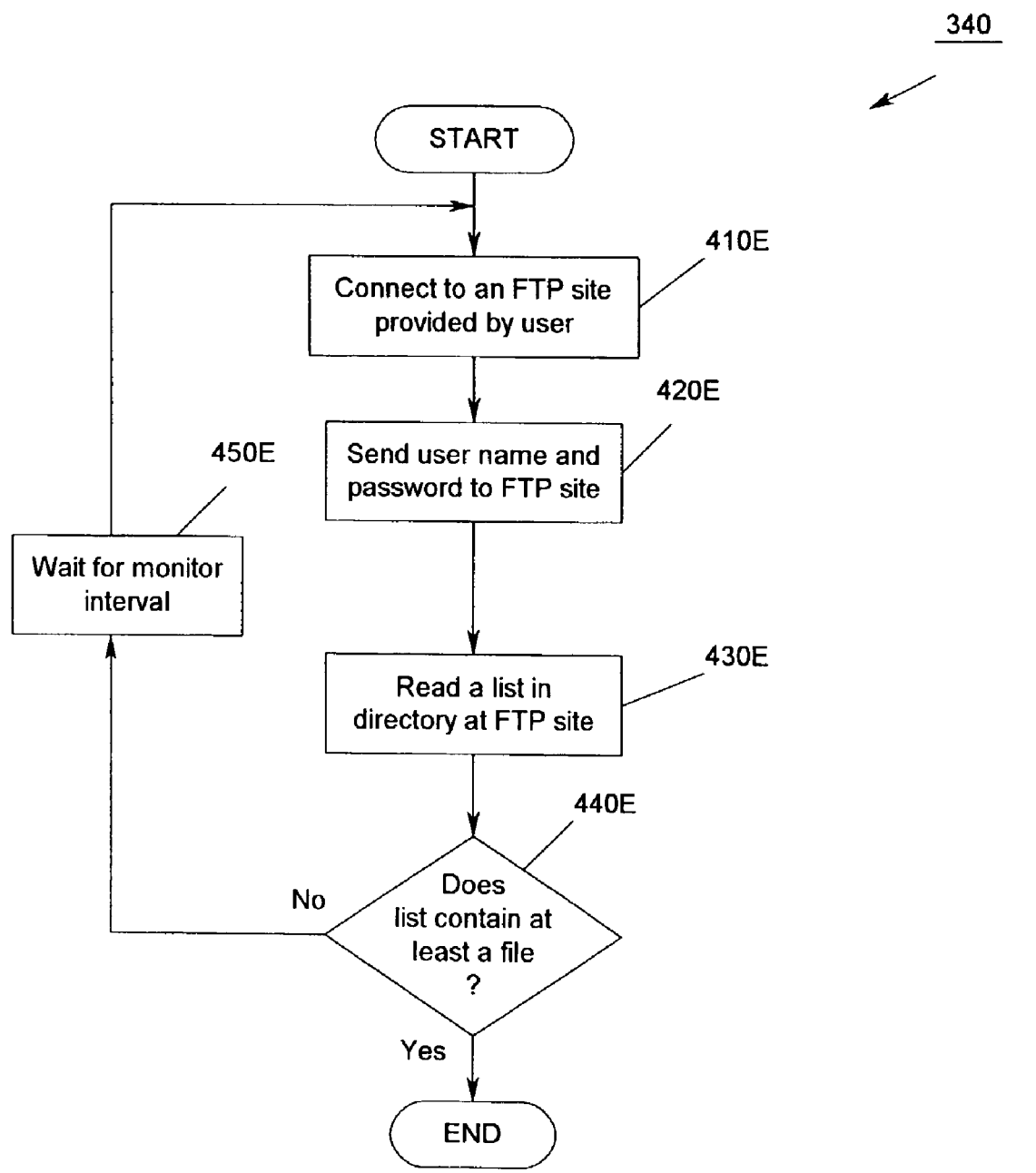
FIG. 4E is a flowchart illustrating a process to generate a monitor event based on a second environmental condition via FTP according to a fifth embodiment of the invention.

FIG. 4E is a flowchart illustrating a process 340 to generate a monitor event based on a second environmental condition via FTP according to one embodiment of the invention.

Upon START, the process 340 connects to an FTP site provided by a user (Block 410E). Then, the process 340 sends a user name and a password to the FTP site (Block 420E). Next, the process 340 reads a list in a directory at the FTP site (Block 430E). The directory is provided by the user. Then, the process 340 determines if the list contains at least a file (Block 440E). The file is generated upon occurrence of a monitor event, such as recording an environmental condition (e.g., image of temperature). If the list does not contain at least a file or is empty, the process 340 waits for a monitor interval provided by the user (Block 450E) and then returns to Block 410E. Otherwise, the process 340 is terminated.

Figure 5:
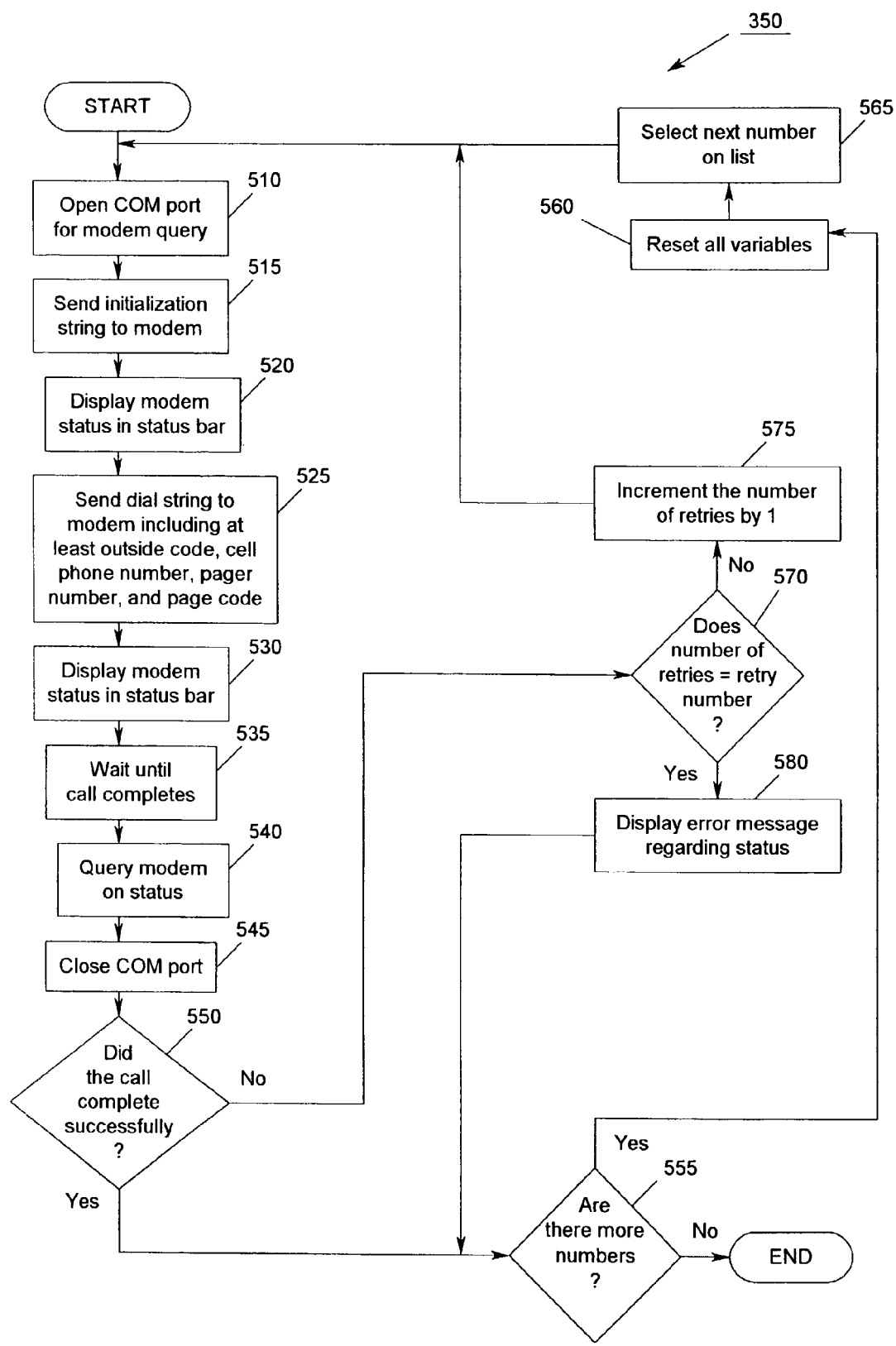
FIG. 5 is a flowchart illustrating a process to notify recipient by dial-up according to one embodiment of the invention.

FIG. 5 is a flowchart illustrating a process 350 to notify recipient by dial-up according to one embodiment of the invention.

Upon START, the process 350 opens a communication port identified by the communication port identifier provided by the user (Block 510). Then, the process 350 sends an initialization string to the modem connected to the open communication port (Block 515). The initialization string initializes the modem by setting up the communication parameters such as transmission rate. Next, the process 350 displays the modem status in the status bar (Block 520). Then, the process 350 sends a dial string to the modem (Block 525). The dial string includes at least the outside code (e.g., 9), the pager number or the cell phone number, and the page code indicating the result of the monitor. Next, the process 350 displays the modem status in the status bar (Block 530). Then, the process 350 waits until the call is completed (Block 535). Next, the process 350 queries the modem on its status (Block 540). Then, the process 350 closes the communication port (Block 545).

Next, the process 350 determines if the call completed successfully (Block 550). If so, the process 350 determines if there are any more numbers left to call (Block 555). Otherwise, the process 350 goes to Block 570. If there are no more numbers left to call, the process 350 is terminated. Otherwise, the process 350 resets all variables (Block 560). One of the variables to be reset is the number of retries. Then, the process 350 selects the next call number on the list (Block 565) and returns to Block 510.

In Block 570, the process 350 determines if the number of retries is equal to the retry number provided by the user. If so, the process 350 displays an error message regarding the status and goes to block 555. Otherwise, the process 350 increments the number of retries by 1 (Block 575) and returns to Block 510.

Figure 6:
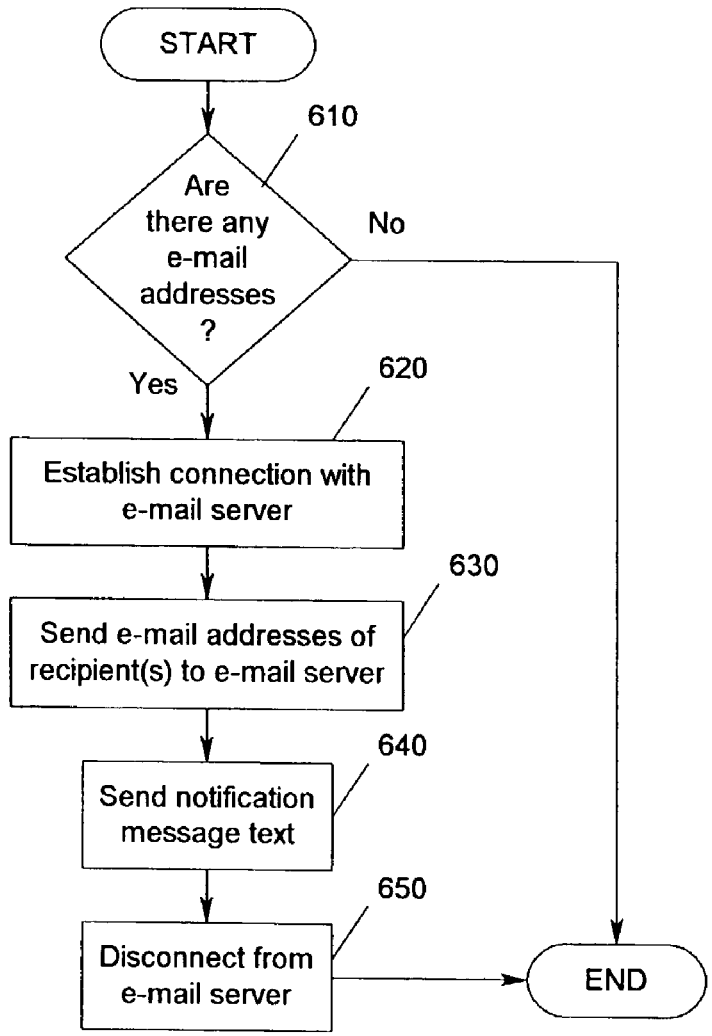
FIG. 6 is a flowchart illustrating a process to notify recipient by e-mail according to one embodiment of the invention.

FIG. 6 is a flowchart illustrating a process 360 to notify recipient by e-mail according to one embodiment of the invention.

Upon START, the process 360 determines if there are any e-mail addresses (Block 610). If not, the process 360 is terminated. Otherwise, the process 360 establishes connection to the e-mail server (Block 620). Next, the process 360 sends the e-mail address or addresses of the recipient or recipients to the e-mail server (Block 630). Then, the process 360 sends the notification message text (Block 640). Next, the process 360 disconnects from the e-mail server (Block 650) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    connecting to a file transfer protocol (FTP) site provided by a user;
    sending a user name and a password to the FTP site;
    retrieving a file name in a directory at the FTP site, the directory being provided by the user;
    comparing the file name with a string supplied by the user, the string corresponding to a monitor event; and
    notifying a recipient of the monitor event if the file name matches the string according to notification information.

2. The method of claim 1 wherein retrieving the file name comprises:
    retrieving the file name of a monitor file generated by an environmental monitoring program.

3. The method of claim 2 wherein retrieving the file name comprises:
    retrieving the file name of the monitor file, the monitor file being generated by an environmental monitoring program when an environmental condition is exceeded.

4. The method of claim 1 further comprising:
    receiving the notification information from the user, the notification information including at least one of a page code, a retry number, a monitor interval, a recipient electronic mail (e-mail) address, a pager number, a cell phone number, a sender e-mail address, an email server, an outside code, and a communication port identifier.

5. The method of claim 4 further comprising:
    waiting for the monitor interval.

6. The method of claim 4 wherein notifying comprises:
    opening a communication port identified by the communication port identifier;
    sending an initializing string to a modem connected to the communication port;
    sending a dial string to the modem, the dial string corresponding at least to one of the outside code, the pager number and the cell phone number; and
    determining status of the modem.

7. The method of claim 6 further comprising:
    retrying notifying for a number of times equal to the retry number if the status indicates a call failure.

8. The method of claim 6 further comprising:
    closing the communication port if the status indicates a call failure.

9. The method of claim 6 further comprising:
    sending the page code to the modem.

10. The method of claim 4 wherein notifying comprises:
    connecting to the e-mail server; and
    sending a notification e-mail to the recipient e-mail addresses using a simple mail transfer protocol (SMTP).

11. An article of manufacture comprising:
    a machine-accessible medium including data that, when accessed by a machine, cause the machine to perform operations comprising:
    connecting to a file transfer protocol (FTP) site provided by a user;
    sending a user name and a password to the FTP site;
    retrieving a file name in a directory at the FTP site, the directory being provided by the user;
    comparing the file name with a string supplied by the user, the string corresponding to a monitor event; and
    notifying a recipient of the monitor event if the file name matches the string according to notification information.

12. The article of manufacture of claim 11 wherein the operation of retrieving the file name comprises:
    retrieving the file name of a monitor file generated by an environmental monitoring program.

13. The article of manufacture of claim 12 wherein the operation of retrieving the file name comprises:
    retrieving the file name of the monitor file, the monitor file being generated by an environmental monitoring program when an environmental condition is exceeded.

14. The article of manufacture of claim 11 wherein the operations further comprise:
    receiving the notification information from the user, the notification information including at least one of a page code, a retry number, a monitor interval, a recipient electronic mail (e-mail) address, a pager number, a cell phone number, a sender e-mail address, an e-mail server, an outside code, and a communication port identifier.

15. The article of manufacture of claim 14 wherein the operations further comprise:
    waiting for the monitor interval.

16. The article of manufacture of claim 14 wherein the operation of notifying comprises:
    opening a communication port identified by the communication port identifier;
    sending an initializing string to a modem connected to the communication port;
    sending a dial string to the modem, the dial sting corresponding at least to one of the outside code, the pager number and the cell phone number; and
    determining status of the modem.

17. The article of manufacture of claim 16 wherein the operations further comprise:

retrying the operation of notifying for a number of times equal to the retry number if the status indicates a call failure.

18. The article of manufacture of claim 16 wherein the operations further comprise:

closing the communication port if the status indicates a call failure.

19. The article of manufacture of claim 16 wherein the operations further comprise:

sending the page code to the modem.

20. The article of manufacture of claim 14 wherein the operation of notifying comprises:

connecting to the e-mail server; and sending a notification e-mail to the recipient e-mail addresses using a simple mail transfer protocol (SMTP).

21. A system comprising:

a processor; and a memory coupled to the processor, the memory containing program code that, when executed by the processor, causes the processor to perform operations comprising:

connecting to a file transfer protocol (FTP) site provided by a user;

sending a user name and a password to the FTP site;

retrieving a file name in a directory at the FTP site, the directory being provided by the user;

comparing the file name with a string supplied by the user, the string corresponding to a monitor event; and notifying a recipient of the monitor event if the file name matches the string according to notification information.

22. The system of claim 21 wherein the operation of retrieving the file name comprises:

retrieving the file name of a monitor file generated by an environmental monitoring program.

23. The system of claim 22 wherein the operation of retrieving the file name comprises:

retrieving the file name of the monitor file, the monitor file being generated by an environmental monitoring program when an environmental condition is exceeded.

24. The system of claim 21 wherein the operations further comprise:

receiving the notification information from the user, the notification information including at least one of a page code, a retry number, a monitor interval, a recipient electronic mail (e-mail) address, a pager number, a cell phone number, a sender e-mail address, an e-mail server, an outside code, and a communication port identifier.

25. The system of claim 24 wherein the operations further comprise:

waiting for the monitor interval.

26. The system of claim 24 wherein the operation of notifying comprises:

opening a communication port identified by the communication port identifier;

sending an initializing string to a modem connected to the communication port;

sending a dial string to the modem, the dial string corresponding at least to one of the outside code, the pager number and the cell phone number; and determining status of the modem.

27. The system of claim 26 wherein the operations further comprise:

retrying notifying for a number of times equal to the retry number if the status indicates a call failure.

28. The system of claim 26 wherein the operations further comprise:

closing the communication port if the status indicates a call failure.

29. The system of claim 26 wherein the operations further comprise:

sending the page code to the modem.

30. The system of claim 24 wherein the operation of notifying comprises:

connecting to the e-mail server; and sending a notification e-mail to the recipient e-mail addresses using a simple mail transfer protocol (SMTP).

* * * * *